United States Patent
Cai et al.

(10) Patent No.: US 8,733,858 B2
(45) Date of Patent: May 27, 2014

(54) COMPUTER ENCLOSURE

(75) Inventors: Chao-Jie Cai, Wuhan (CN); Wei Liang, Wuhan (CN); Yong Ma, Wuhan (CN); Yu-Lin Liu, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 8 days.

(21) Appl. No.: 13/562,780

(22) Filed: Jul. 31, 2012

(65) Prior Publication Data

US 2013/0134844 A1 May 30, 2013

(30) Foreign Application Priority Data

Nov. 30, 2011 (CN) .......................... 2011 1 0389442

(51) Int. Cl.
*A47B 81/00* (2006.01)

(52) U.S. Cl.
USPC ....................................... 312/223.2; 312/215

(58) Field of Classification Search
USPC ............... 312/223.2, 215, 216; 292/194, 195, 292/198, 202, 288, 289, DIG. 63, DIG. 54, 292/DIG. 62
See application file for complete search history.

(56) References Cited

U.S. PATENT DOCUMENTS

| | | | | |
|---|---|---|---|---|
| 6,288,332 | B1 * | 9/2001 | Liu et al. | 174/542 |
| 6,530,628 | B1 * | 3/2003 | Huang et al. | 312/223.2 |
| 7,057,898 | B2 * | 6/2006 | Chen et al. | 361/725 |
| 7,113,396 | B2 * | 9/2006 | Chen et al. | 361/807 |
| 7,248,464 | B1 * | 7/2007 | Chiang | 361/679.55 |
| 7,327,567 | B2 * | 2/2008 | Chen et al. | 361/679.41 |
| 7,639,506 | B2 * | 12/2009 | Chen et al. | 361/747 |
| 8,199,499 | B2 * | 6/2012 | Chen et al. | 361/679.6 |
| 2005/0152107 | A1 * | 7/2005 | Chen et al. | 361/683 |
| 2006/0139865 | A1 * | 6/2006 | Chen et al. | 361/683 |
| 2006/0139866 | A1 * | 6/2006 | Chen et al. | 361/683 |
| 2008/0049401 | A1 * | 2/2008 | Lee et al. | 361/727 |
| 2012/0026685 | A1 * | 2/2012 | Chen et al. | 361/679.59 |
| 2012/0038252 | A1 * | 2/2012 | Chen et al. | 312/223.2 |

* cited by examiner

*Primary Examiner* — Daniel Rohrhoff
(74) *Attorney, Agent, or Firm* — Novak Druce Connolly Bove + Quigg LLP

(57) ABSTRACT

A computer enclosure includes a computer case and a power supply tray. The computer case includes a side plate and a rear plate adjacent to the side plate. A clamping portion is located on the rear plate, and an opening is defined between the side plate and the rear plate. The power supply tray is attached to the opening and includes a clipping member. The clipping member includes a securing portion extending from the power supply tray and a clipping portion rotatably attached to the securing portion. The clipping portion is engaged with the clamping portion to secure the power supply tray to the computer case, and the clipping portion is rotatable relative to the rear plate to disengage the clipping portion from the clamping portion.

20 Claims, 4 Drawing Sheets

COMPUTER ENCLOSURE

BACKGROUND

1. Technical Field

The present disclosure relates to a computer enclosure.

2. Description of Related Art

Computer enclosures hold many electronic elements, such as a motherboard, hard disk drives, PCI devices, power supplies, fans, and so on. Generally, a rear plate is not secured to a side plate. However, the side plate is often accidentally clipped with the side plate of the computer case, so that the side plate cannot be normally opened. Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
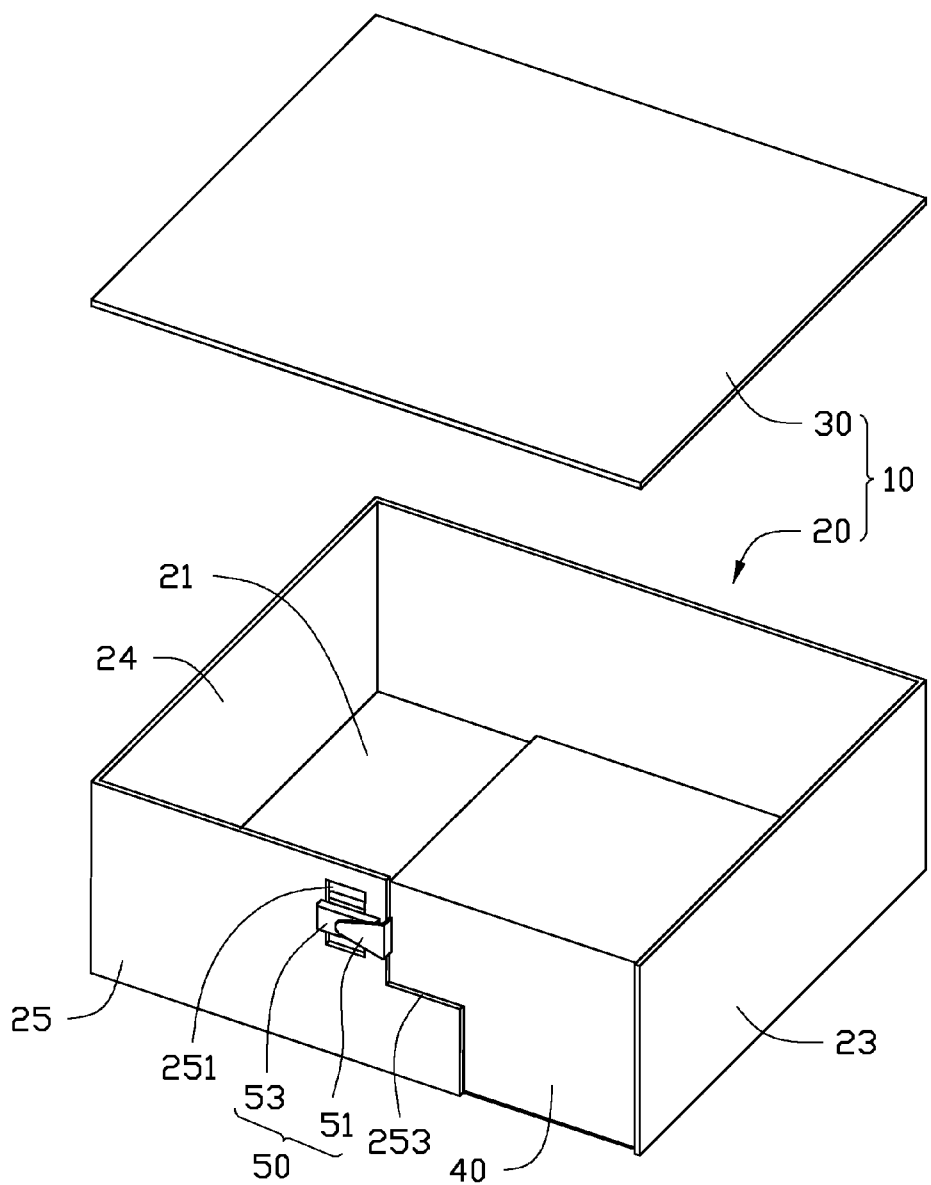
FIG. 1 is an exploded, isometric view of a computer enclosure in accordance with an embodiment.
Figure 2:
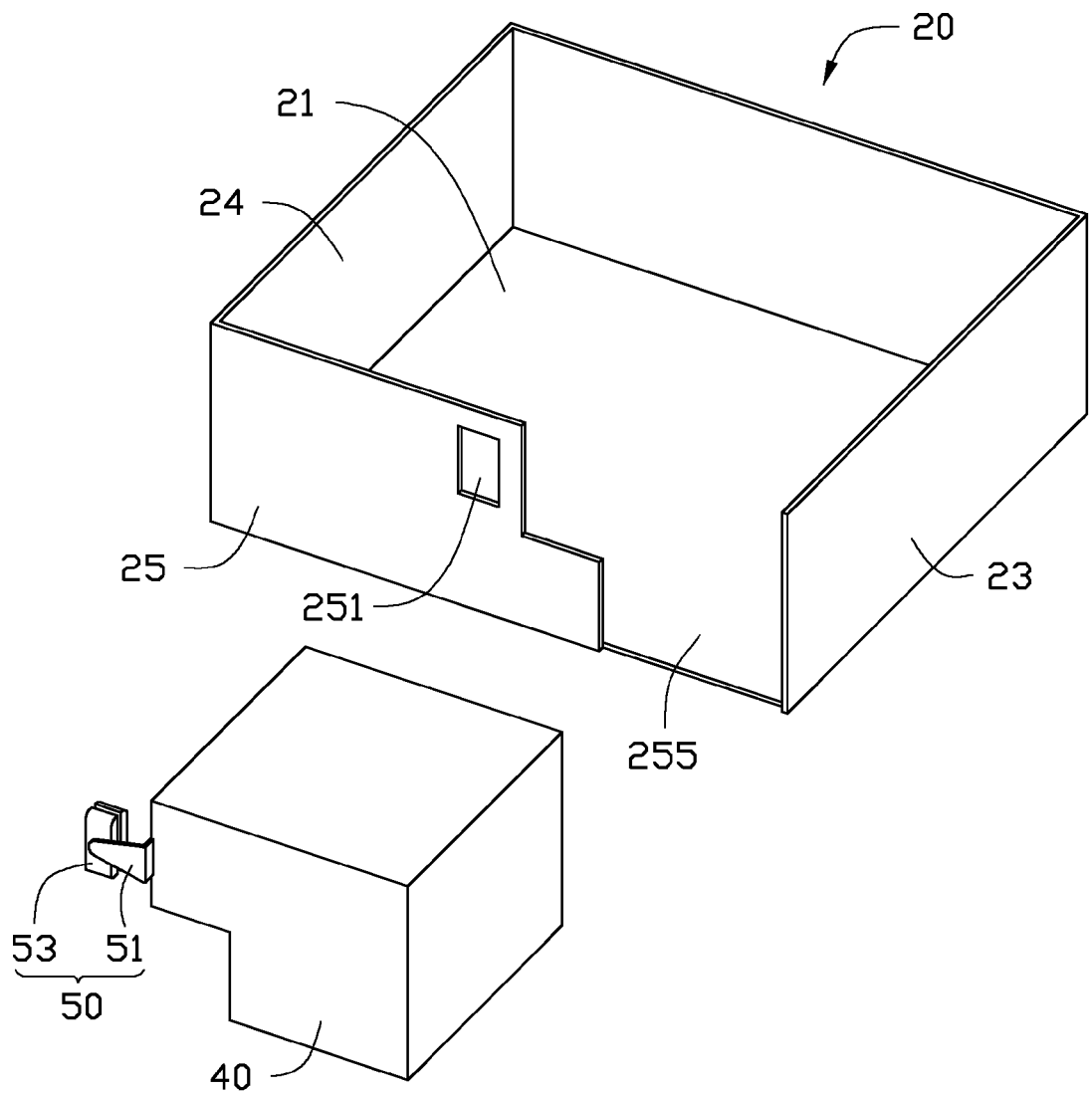
FIG. 2 is a partially exploded, isometric view of the computer enclosure of FIG. 1.

FIGS. 1 and 2, illustrate a computer enclosure in accordance with an embodiment. The computer enclosure includes a computer case 10, a power supply tray 40 attached to the computer case 10, and a clipping member 50 attached to the power supply tray 40.

The computer case 10 includes a base 20 and a cover 30 attached to the base 20. The base 20 includes a bottom plate 21, two side plates 23, 24, and a rear plate 25 connected to the two side plates 23, 24. In one embodiment, the rear plate 25 is substantially perpendicular to the bottom plate 21, and the two side plates 23, 24 are substantially parallel to each other. An opening 255 such as a through hole 251 are defined in the rear plate 25. In one embodiment, a clamping portion can be a securing piece, and the opening 255 is located between the rear plate 25 and one of the two side plates 23, to allow the power supply tray 40 to enter into the computer case 10. In one embodiment, the through hole 251 is a substantially rectangle.

The power supply tray 40 can be arrange at a corner connected to the rear plate 25 and the side plate 23, to cover the opening 255. At this point, a panel of the power supply tray 40 and the rear plate 25 are arranged on a common plane.

Figure 3:
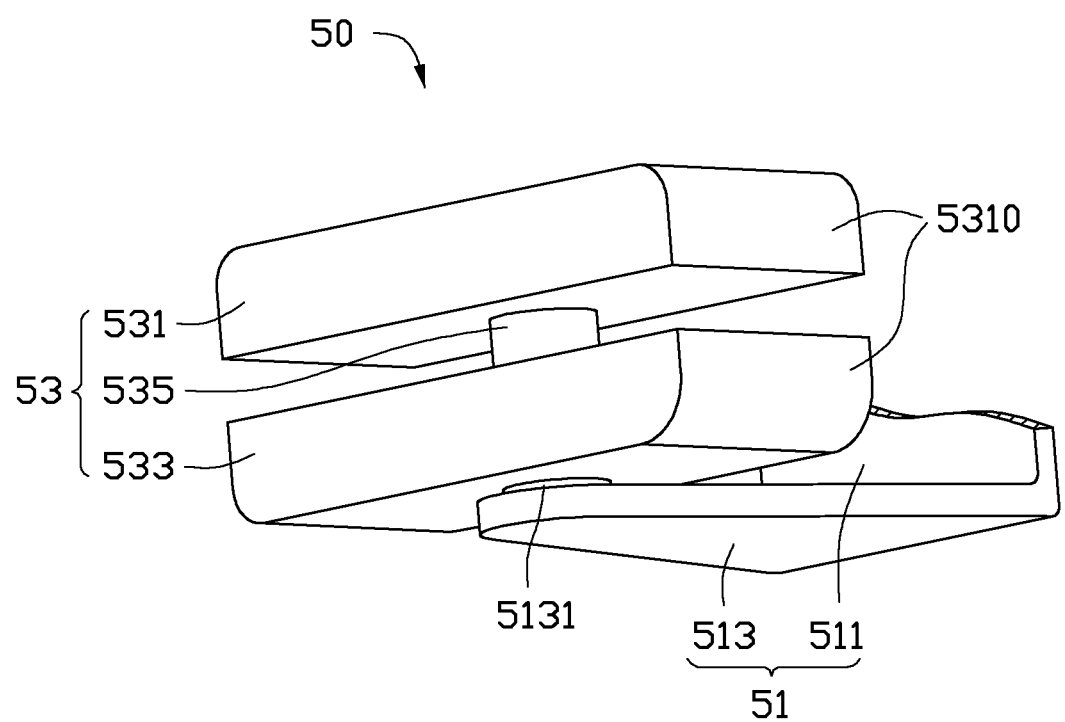
FIG. 3 is an isometric view of a clipping member of the computer enclosure of FIG. 1.

FIG. 3, illustrates the clipping member 50 of the computer enclosure in accordance with an embodiment. The clipping member 50 includes a securing portion 51 secured to the power supply tray 40 and a clipping portion 53 rotatably attached to the securing portion 51. The securing portion 51 includes a connecting piece 511 extending from the power supply tray 40 and a securing piece 513 connected to the connecting piece 511. In one embodiment, the securing piece 513 is a triangle and is substantially perpendicular to the connecting piece 511. A rotating shaft 5131 extends from the securing piece 513 and connected to the clipping portion 53.

The clipping portion 53 includes a first clipping piece 531, a second clipping piece 533, and a connecting portion 535 connected to the first clipping piece 531 and the second clipping piece 533. In one embodiment, the clipping portion 53 is substantially H-shaped. The first clipping piece 531 defines an arcuate surface 5310, and the second clipping piece 533 also defines an arcuate surface 5310. In one embodiment, the first clipping piece 531 is substantially parallel to the second clipping piece 533, and a cross-section of the first clipping piece 531 and a cross-section of the second clipping piece 533 are all rectangle. A receiving hole (not shown) is defined in the second clipping piece 533 to receive the rotating shaft 5131. In one embodiment, a length of the first clipping piece 531 is substantially equal to that of the second clipping piece 533, less than a length of the through hole 251, and greater than a width of the through hole 251; a width of the first clipping piece 531 is substantially equal to that of the second clipping piece 533, and greater than a width of the through hole 251.

Figure 4:
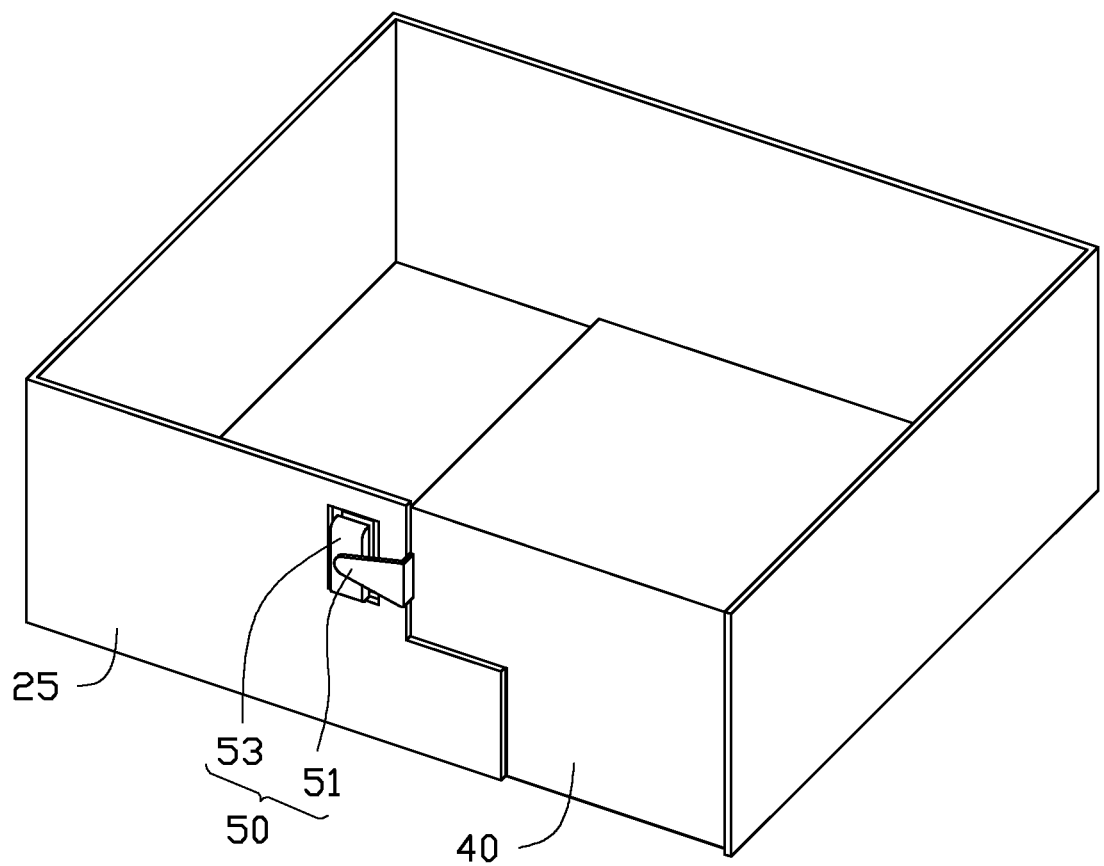
FIG. 4 is an assembled view of FIG. 2.

FIGS. 1 and 4 illustrate an assembly of the computer enclosure in accordance with an embodiment. In assembly, the power supply tray 40 is entered into the computer case 10 via the opening 255, and the clipping member 50 is adjacent to the through hole 251. The clipping portion 53 is rotated about the rotating shaft 5131 to align the clipping portion 53 with the through hole 251 (shown in FIG. 4). The power supply tray 40 is further moved, until the first clipping piece 531 extends through the through hole 251 and located on an inner surface of the rear plate 25, and the connecting portion 535 is engaged in the through hole 251. The clipping portion 53 is rotated about the rotating shaft 5131 in a first direction, until the clipping portion 53 is engaged in the through hole 251 (shown in FIG. 1). At this point, the rear plate 25 is sandwiched between the first clipping piece 531 and the second clipping piece 533, to prevent the clipping portion 53 from disengaging from the through hole 251.

In disassembly, the clipping portion 53 is rotated about the rotating shaft 5131 in a second direction opposite to the first direction, until the clipping portion 53 is aligned with the through hole 251. The power supply tray 40 is moved to disengage the first clipping piece 531 from the through hole 251, and the power supply tray 40 can be moved out of the computer case 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A computer enclosure comprising:
    a computer case comprising a side plate and a rear plate adjacent to the side plate; a clamping portion located on the rear plate, and an opening defined in the rear plate and located between the side plate and the rear plate; and
    a power supply tray received in the opening and comprising a clipping member; the clipping member comprising a securing portion extending from the power supply tray and a clipping portion rotatably attached to the securing portion; the clipping portion comprising a first clipping piece and a second clipping piece; the first clipping piece being located on an inner surface of the rear plate, the second clipping piece located on an outer surface of the rear plate, and the rear plate being located between the first clipping piece and the second clipping piece;

wherein the clipping portion is engaged with the clamping portion to secure the power supply tray to the computer case, and the clipping portion is rotatable relative to the rear plate to disengage the clipping portion from the clamping portion.

2. The computer enclosure of claim 1, wherein the clamping portion is a through hole, and the through hole is a rectangle.

3. The computer enclosure of claim 2, wherein a length of the clipping portion is less than a length of the through hole and greater than a width of the through hole.

4. The computer enclosure of claim 2, wherein the clipping portion further comprises a connecting portion, and the connecting piece is perpendicularly connected to the first clipping piece and the second clipping piece.

5. The computer enclosure of claim 4, wherein an arcuate surface is defined in the first clipping piece to guide the first clipping piece into through hole.

6. The computer enclosure of claim 4, wherein the first clipping piece is substantially parallel to the second clipping piece.

7. The computer enclosure of claim 4, wherein the securing portion comprises a rotating shaft, and the rotating shaft is rotatably secured to the second clipping piece.

8. The computer enclosure of claim 7, wherein the securing portion further comprises a connecting piece extending from a panel of the power supply tray, and a securing piece substantially perpendicular to the connecting piece; and the rotating shaft extends substantially perpendicular from the securing piece.

9. The computer enclosure of claim 8, wherein the securing piece is substantially a triangle.

10. The computer enclosure of claim 1, wherein a cross-section of the clipping portion is substantially H-shaped.

11. A computer enclosure comprising:
a computer case comprising a side plate and a rear plate adjacent to the side plate; a through hole and an opening defined in the rear plate; and
a power supply tray attached to the opening and comprising a clipping member rotatably attached to a panel of the power supply tray;

wherein the clipping member is rotatable relative to the rear plate between an unlock position and a lock position, when the clipping member is in the unlock position, the clipping member is aligned with the through hole, for the clipping member entering into the computer case, when the clipping member is in the lock position, the clipping member is engaged with the through hole, for preventing the power supply tray moving out of the computer case.

12. The computer enclosure of claim 11, wherein the clipping member comprising a securing portion extending from the power supply tray and a clipping portion rotatably attached to the securing portion, and the clipping portion is engaged in the through hole.

13. The computer enclosure of claim 12, wherein the through hole is a rectangle, and a length of the clipping portion is less than a length of the through hole and greater than a width of the through hole.

14. The computer enclosure of claim 12, wherein a cross-section of the clipping portion is H-shaped.

15. The computer enclosure of claim 12, wherein the clipping portion comprises a first clipping piece, a second clipping piece and a connecting portion connected to the first clipping piece and the second clipping piece; the first clipping piece is located on an inner surface of the rear plate, the second clipping is located on an outer surface of the rear plate, so that the rear plate is located between the first clipping piece and the second clipping piece.

16. The computer enclosure of claim 15, wherein an arcuate surface is defined in the first clipping piece to guide the first clipping piece into through hole.

17. The computer enclosure of claim 15, wherein the first clipping piece is substantially parallel to the second clipping piece.

18. The computer enclosure of claim 15, wherein the securing portion comprises a rotating shaft, and the rotating shaft is rotatably secured to the second clipping piece.

19. The computer enclosure of claim 18, wherein the securing portion further comprises a connecting piece and a securing piece substantially perpendicular to the connecting piece; and the rotating shaft extends substantially perpendicular from the securing piece.

20. The computer enclosure of claim 19, wherein the securing piece is substantially a triangle.

* * * * *